Oct. 9, 1962  K. A. ZWANGER  3,057,565
MILL FOR GRINDING OF COFFEE AND OF SIMILAR AROMATIC MATTER
Filed Nov. 28, 1958  2 Sheets-Sheet 1

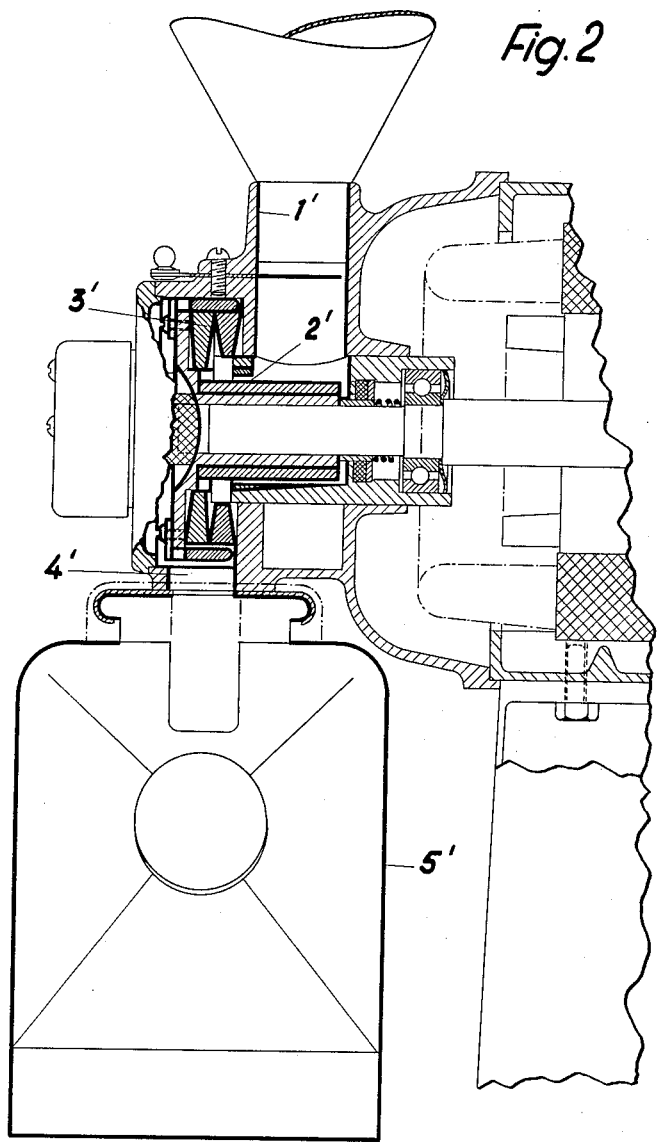

United States Patent Office 3,057,565
Patented Oct. 9, 1962

3,057,565
MILL FOR GRINDING OF COFFEE AND OF SIMILAR AROMATIC MATTER
Karl August Zwanger, Grosser Reitweg 17, Pinneberg b., Hamburg, Germany
Filed Nov. 28, 1958, Ser. No. 776,924
Claims priority, application Germany Nov. 28, 1957
5 Claims. (Cl. 241—244)

The present invention relates to a mill for grinding of coffee and of similar aromatic matter.

It is one object of the present invention to provide a mill for grinding of coffee and of similar aromatic matter which includes means permitting the retaining the aroma during the grinding of coffee or similar aromatic matter and to avoid the destruction of said aroma, respectively.

Mills for grinding of coffee and of similar aromatic matter are known which operate with a preliminary breaker with a grinding tool. In order to harden the grinding tools, it has been proposed before to provide a chromic surface layer on said tools.

Experiments have disclosed that a destruction of said aroma occurs with the known mills. This destruction is caused substantially by the fact that the goods to be ground come into contact with iron or also with other material, for instance aluminum, during their feeding through the mill. In particular, in case iron is used as a working material for the mill, chemical marginal plane reactions occur, which have an unfavorable effect on the taste and the life of the goods to be ground. Iron parts of the mill may operate as a catalyzer, if oxygen and humidity is simultaneously present. In this case the light volatile aromatic matter is separated from the fatty acids and evaporates very fast. It has been further found that static chargings occur in the mill, which lead to a liberation and destruction of the etheric oils. The aroma is bound to its greater part to the non-saturated fatty acid in the aromatic matter, as coffee. Due to the addition of oxygen during the grinding process and due to the presence of the unavoidable humidity, the aromatic particles are freed and disintegrated by the mentioned marginal line reactions.

An electromotive disintegrator for coffee is known wherein the working container is made of material which comprises in addition to sheet metal also artificial material, glass or the like. It is further known that the knives are made in coffee grinding mills of a steel having a heavy chrome layer and finally a coffee grinding mill is also known wherein the hopper or feeding channel for the goods to be ground is made of artificial material or glass.

It is, therefore, an object of the present invention to maintain the aroma of the goods to be ground during the grinding process and to avoid chemical processes which lead to a change of the taste and aroma, by rendering passive, that means chemically non-reactive the surface of those portions of the mill which come into contact with the goods to be ground.

It is another object of the present invention to provide a mill for grinding of coffee and of similar aromatic matter wherein, in order to maintain the aroma of the goods to be ground and to avoid the chemical marginal plane reactions which affect the taste and the life of the goods unfavorably. Passivity means are applied to the surfaces of the tool or tools, to the feeding channel, to the inner wall of the container, to the discharging channel and to the receiving container, which come into contact with the goods to be ground, that means to render such surfaces more or less passive in a chemical sense, in other words such surfaces are not likely to perform damaging chemical reactions.

The passivity of all surfaces which come into contact with the goods to be ground may be obtained, among other means, by providing a surface chrome layer or by any other means as a hard, wear resistant metallic material which renders chemically passive and which renders chromic or anodic the particular parts of said surfaces. In this case it is of advantage to subject the surfaces of all parts of the mill equally passive, in particular all parts of the mill which come into contact with the goods to be ground, as long as different working material is used for such different parts, that means that all corresponding parts are equipped with the same layer.

It is already known in connection with disintegrator tools to harden the active surface thereof by providing a chrome layer. It was, however, not recognized, that all other parts of the mill as the hopper or feeding channel, the preliminary breaker, the discharge channel, must be treated in the same manner.

It is, therefore, still another object of the present invention, to provide a mill for grinding of coffee and of similar aromatic matter wherein in addition to the disintegrator tools also all other parts of the walls of the mill are subjected to a passivity layer, so that in chemical and electro-chemical sense an equality of the system is brought about.

It is a still further object of the present invention to provide a mill wherein the individual part of the tool or tools which are subjected to greater wear, as for instance the points and edges of the tool to subject to a greater passivity, for instance by providing such special parts with a heavier chrome layer than that provided for the other parts.

With these and other objects in view which will become apparent in the following detailed description, the present invention will be clearly understood in connection with the accompanying drawings in which:

FIG. 2 is a vertical section through a mill constituting a different embodiment of said mill.

Figure 1:
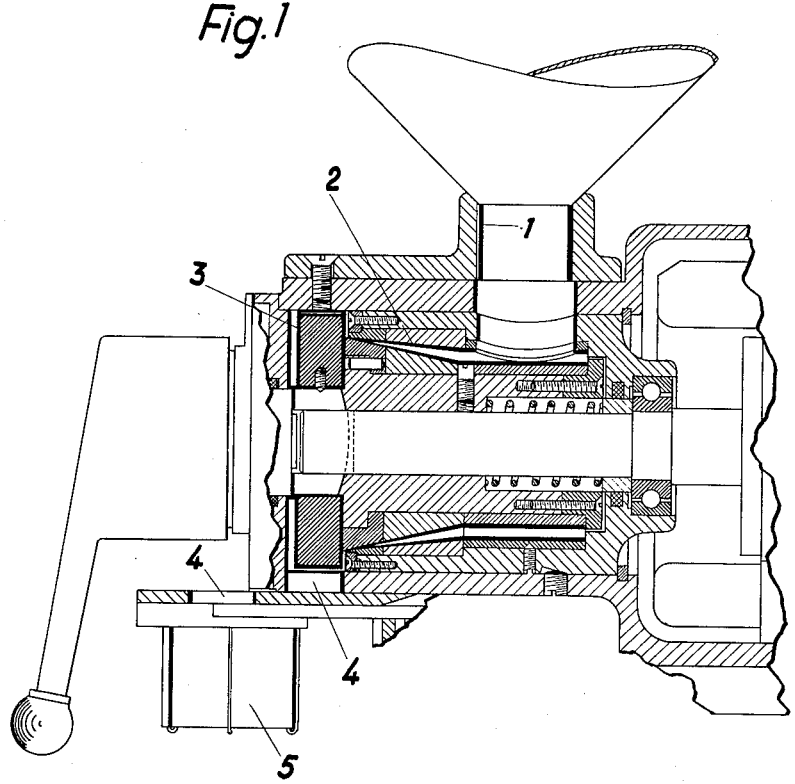
FIGURE 1 is a vertical section through one grinding mill.

Referring now to the drawings, it should be stated that the construction of the mills disclosed in FIGS. 1 and 2 is of conventional nature and is not subject of the present invention. The present invention resides in the provision of layers rendering surfaces passive which have not been subjected to such passivity layer before.

All parts of the mill with which the goods to be ground, for instance coffee, is coming into contact are subjected to passivity. The drawings indicate the surfaces which are subjected to passivity by heavier lines. Since the mill disclosed in FIGS. 1 and 2 are as to their structure of conventional nature, it will suffice to limit the detailed specification to the particular parts which are equipped with the particular surface layer which render the passivity.

The particular layers are provided, as clearly shown in FIGS 1 and 2, in the feeding channel 1 and 1', respectively, the preliminary breaker 2 and 2', respectively, the grinding tools 3 and 3', respectively, the discharging channel 4 and 4', respectively, and the receiving container 5 and 5', respectively, for the ground goods. It has been found that coffee, which has been ground with such mill, has a much improved aroma and that this aroma is maintained quite well for a longer period of time as it has been ascertained in connection with mills which are not equipped with the specific features of the present invention.

While I have disclosed two embodiments of the present invention, it is to be understood that these embodiments are given by example only and not in a limiting sense, the scope of the present invention being determined by the objects and the claims.

I claim:

1. A mill for grinding or granulating of coffee or similar aromatic matter, comprising a container, a shaft rotatably disposed in said container, a grinding tool secured to said shaft, a hopper arranged on top of said container, a feeding channel communicating with said hopper, a discharging channel and a receiving chamber, said discharging channel communicating with said receiving chamber, the surfaces of said grinding tool, of said feeding channel, of the inner wall of said container, of said discharging channel and of said receiving chamber having a metallic layer of passivity rendering and hard, wear resistant material, said surfaces engaging said matter to be ground, in order to retain the aroma of the matter to be ground, and in order to avoid chemical marginal plane reactions with the building materials of said mill, which chemical marginal plane reactions affect unfavorably the taste and the life of said matter.

2. The mill, as set forth in claim 1, wherein said passivity rendering material comprises a chrome layer.

3. The mill, as set forth in claim 1, wherein said tool has at its surface a chrome layer, and said other surfaces have a passivity rendering and hard, wear resistant metallic layer, so that an equality of the system is achieved in the chemical and the electrochemical sense.

4. The mill, as set forth in claim 3, wherein predetermined portions of the surface of said tool have a heavier chrome layer than the remaining portions of said surface of said tool.

5. The mill, as set forth in claim 4, wherein the surface of the points and edges of said tool have a heavier chrome layer than the remaining surface of said tool.

References Cited in the file of this patent

UNITED STATES PATENTS

| | | |
|---|---|---|
| 933,008 | Warner | Aug. 31, 1909 |
| 1,238,784 | Keary | Sept. 4, 1917 |
| 1,629,377 | Buckwalter | May 17, 1927 |
| 1,970,723 | Wolfe | Aug. 21, 1934 |
| 2,070,545 | Gilbert | Feb. 9, 1937 |
| 2,138,204 | Rable | Nov. 29, 1938 |

OTHER REFERENCES

"Coffee the Beverage" (Foot), Spice Mill Publishing Company, 1925, page 94 relied upon.

"Removal of Iron From Water for Coffee" (Punnett), Tea and Coffee Trade Journal, August 1958, page 20.